United States Patent [19]

Kalcevic et al.

[11] Patent Number: 4,751,063
[45] Date of Patent: Jun. 14, 1988

[54] PROCESS FOR TREATING SPENT CATALYST INCLUDING ANTIMONY HALIDES FROM CHLOROFLUOROCARBON PRODUCTION

[75] Inventors: Victor Kalcevic; John F. McGahan, both of Knoxville, Tenn.

[73] Assignee: International Technology Corporation, Knoxville, Tenn.

[21] Appl. No.: 16,268

[22] Filed: Feb. 19, 1987

[51] Int. Cl.$^4$ .................... C01B 29/00; B01J 38/48; B01J 23/92
[52] U.S. Cl. .................... 423/87; 423/617; 502/24; 570/167
[58] Field of Search .................... 502/24, 25, 27; 470/167; 423/87, 489, 490, 493, 178, 617

[56] References Cited

U.S. PATENT DOCUMENTS

| | | | |
|---|---|---|---|
| 2,415,346 | 2/1947 | Farr | 22/89 |
| 3,806,589 | 4/1974 | Becher | 423/491 |
| 3,872,210 | 3/1975 | Ukaji et al. | 423/87 |
| 4,005,176 | 1/1977 | Fernschild et al. | 423/87 |
| 4,411,874 | 10/1983 | Lee | 423/87 |

OTHER PUBLICATIONS

Advanced Inorganic Chemistry. Authors: F. Albert Cotton, Robert A. Welch, Geoffrey Wilkinson, Sir Edward Frankland, Published by John Wiley & Sons, p 759.

*Primary Examiner*—Paul E. Konopka
*Attorney, Agent, or Firm*—Luedeka, Hodges & Neely

[57] ABSTRACT

A process in which spent catalyst from chlorofluorocarbon production is treated to detoxify the catalyst for safe disposal or reprocessing. The spent catalyst includes antimony and arsenic halides, halogenated organic liquids, and has an upper liquid portion and a lower sludge or semisolid portion. The processing of both the liquid and sludge portions includes hydrolyzing the catalyst in an aqueous solution of ferric chloride resulting in formation of a ferric ion/fluoride ion complex in addition to insoluble compounds, and neutralizing the reaction mass following hydrolysis with an aqueous suspension of calcium hydroxide. The volatile organics are stripped from the neutralized reaction mass and collected for reuse or disposal. The reaction mass is dried to yield the insoluble compounds in a solid form for subsequent reprocessing or disposal. The sludge portion is preferably treated separately following treatment of the liquid portion by dissolving the sludge in situ before hydrolyzing using an organic liquid solvent comprising a mixture of n-butanol and previously collected volatile organic liquids.

13 Claims, No Drawings

PROCESS FOR TREATING SPENT CATALYST INCLUDING ANTIMONY HALIDES FROM CHLOROFLUOROCARBON PRODUCTION

The present invention relates to processes for treating spent catalysts and more particularly relates to a process for treating a spent catalyst including antimony and arsenic halides from chlorofluorocarbon production to detoxify the spent catalyst so that it may be safely disposed of or further processed for reuse.

Antimony halides such as $SbCl_5$ are used extensively as catalysts in the production of chlorofluorocarbons. Antimony usually includes small amounts of arsenic and both the antimony and arsenic are halogenated during preparation of the catalyst. Following a period of use, the catalyst activity decreases, mainly because of the loss of halogens to the reaction medium and the accumulation of impurities or contaminants therein, necessitating removal of the spent catalyst and replacement with fresh catalyst having the required activity. Consequently, a spent catalyst from the manufacture of chlorofluorocarbons will typically include both antimony and arsenic halides in varying degrees of halogenation in addition to various other impurities and contaminants. Many of the impurities and contaminants along with the arsenic compounds in the spent catalyst are highly toxic even in very small quantities.

Various methods have been proposed to treat spent catalyst from chlorofluorocarbon production so that the catalyst can be safely disposed of, shipped, or prepared for reuse. For example, in the method disclosed in U.S. Pat. No. 4,411,874 to Lee, the spent catalyst is hydrolyzed in the presence of calcium chloride which is said to produce insoluble antimony and arsenic compounds in or with an aqueous liquid phase. In Lee, an organic phase is formed below the aqueous phase. The organic phase is phase separated from the aqueous phase following completion of the hydrolysis. The hydrolysis produces halide ions in the aqueous phase including chlorides and fluorides, resulting in a reaction mass that is strongly acidic. When the pH of the aqueous phase is raised, additional antimony and arsenic precipitate along with other insoluble compounds. These are separated from the aqueous phase by filtration, after which the filtrate may be further neutralized with lime.

In actual practice, the Lee method has not been entirely satisfactory. The method requires difficult filtration steps, and phase separation techniques for removal of the organic compounds from the hydrolysis reaction mass, both of which often result in incomplete separation. In addition, the composition of the reaction mass following hydrolysis can result in conditions which have a detrimental effect on the processing equipment and in particular the reaction vessel itself.

It has also been proposed to treat spent catalyst from chlorofluorocarbon manufacturing by hydrolyzing the catalyst in a base slurry such as an aqueous lime suspension. Since the hydrolysis occurs under alkaline conditions, the fluoride precipitates as insoluble calcium fluoride, thus minimizing the problem of fluoride ion attack on the processing equipment. Nevertheless, this method has not been widely used because it promotes dehydrohalogenation of halogenated organics present in the spent catalyst, forming dangerous and toxic reaction products including vinyl halides.

Another difficulty in treating spent catalyst from chlorofluorocarbon production stems from the presence of a heavy sludge or semisolid portion of the spent catalyst which gradually evolves during storage. The proportion of the sludge to liquid is variable but can comprise as much as 50% of the catalyst volume. This portion of the spent catalyst is difficult to treat effectively as the halides in the sludge may be in the form of agglomerations which are not readily or uniformly treated. Also, the consistency of the sludge makes it very difficult and in some cases impossible to transport to a reaction vessel. Previous methods have failed to provide a suitable means for treating this sludge portion and in particular have failed to provide for treatment of the sludge in an integrated processing scheme which is capable of treating both the liquid and sludge portions.

It is therefore an object of the present invention to provide a process for treating spent catalyst from chlorofluorocarbon production to detoxify the catalyst so that it can be safely disposed of or subsequently processed for reuse.

It is another object of the invention to provide a process for treating spent catalyst from chlorofluorocarbon production wherein the catalyst includes antimony and arsenic halides which undergo hydrolysis to produce fluoride ions and in which the process substantially eliminates the existence of free fluoride ions in the hydrolysis reaction mass.

A further object of the invention is to provide a process of the character described which includes provision for effectively treating the sludge portion of the spent catalyst in an integrated processing scheme which is capable of treating both the liquid and sludge portions using substantially the same processing equipment.

Yet another object of the invention is the provision of a process for treating spent catalyst from chlorofluorocarbon production which utilizes a minimal number of relatively easily controllable processing steps.

The above and other objects and advantages of the present invention will become better understood from the following description of preferred embodiments.

As previously noted, the spent catalyst to which the processes of the present invention is applied includes mainly mixed antimony and arsenic halides previously used in chlorofluorcarbon production and have been removed due to a loss in their catalytic activity. The manufacture of chlorofluorocarbons such as the products sold under the trademark FREON is well-known in the art and need not be described herein except to note that a preferred catalyst in the manufacturing process is $SbCl_5$ which may be accompanied by $AsCl_3$ contamination. Also, the chlorofluorocarbon production processes typically employ hydrofluoric acid as the fluorinating agent. This can be another source of arsenic contamination in the catalyst.

When removed from the production process, the spent catalyst may include a diverse mixture of compounds in addition to mixed antimony and arsenic chlorides and fluorides. For example, the spent catalyst may include bromine compounds when a bromine catalyst is employed, hydrogen chloride, hydrogen fluoride, hydrogen bromide, phosgene, carbonyl fluoride, heavy metal chlorides, silicon halides, silicon dioxide and various halogenated organic compounds, some of which are those produced in the chlorofluorocarbon production process. While the spent catalyst may include compounds in addition to those mentioned above, it is noted that typically the major components are $SbCl_5$, $SbCl_4F$, $SbCl_3$, $AsCl_3$, HF, partially chlorinated methane, partially chlorinated ethane, and chlorofluorocarbons of 1 to 5 carbon atoms. The total content of antimony and arsenic halides may be in the range of 30 to 90 percent. The proportion of halide or total halides of antimony to halide or total halides of arsenic may typically be in the range of 3:1 to 20:1. The total of halogenated hydrocarbons will usually be from 5 to 60 percent. The hydrogen fluoride may constitute from 3 to 15 percent of this spent catalyst and heavy metal halides may be present in small quantities.

The spent catalyst is highly reactive with either air or water and is capable of producing very hazardous conditions when so exposed unless the exposure is made under a closed system to control the rate of reaction. On exposure to moisture in air or to water dense white, mainly hydrochloric acid, fumes are created.

Normally, the spent catalyst is removed from the chlorofluorocarbon production process and stored in a holding vessel which may be a railroad tank car, for example. During storage, the spent catalyst gradually evolves reaction products. It is believed that this occurs due to limited hydrolysis in that a small amount of water often exists or is produced in the storage vessel to facilitate the hydrolysis. This is thought to contribute significantly to formation of a sludge or semisolid portion of the spent catalyst in the storage vessel which may comprise up to 50% of the total volume of the spent catalyst depending on the length of storage. The composition of the sludge may vary considerably but it is thought that the antimony and arsenic halides comprise an appreciable portion of the sludge along with settled precipitates of widely varying composition and heavy organic compounds. Above the sludge, the spent catalyst includes a reddish-yellow, oily liquid portion containing the antimony and arsenic halides as well as variable amounts of the other components typically existing in the spent catalyst as indicated above. In addition, the spent catalyst may include various low boiling organic compounds which have evolved during storage that vaporize readily when the storage vessel is opened.

In general, the invention includes a process for treating spent catalyst from chlorofluorocarbon production, the spent catalyst including the aforementioned antimony halides along with various other constituents as described. The spent catalyst undergoes hydrolysis in an aqueous medium to form reaction products including insoluble antimony compounds and fluoride ions. The process comprises hydrolyzing the spent catalyst in an aqueous solution of ferric chloride having a sufficient concentration of ferric ions to complex substantially all of the fluoride ions produced upon hydrolysis of the catalyst. The reaction mass following hydrolysis is acidic due to the presence of various halogen acids. However, in the complexed form, the fluoride ions are not free to attack processing equipment, enabling the use of a glass-lined reactor. Following hydrolysis of the catalyst and complexing of the fluoride ions, the reaction mass is neutralized, preferably with an aqueous suspension of calcium hydroxide. The insoluble antimony compounds are then separated from the neutralized reaction mass. Preferably, the separation is accomplished by heating the reaction mass in a drier to evaporate the aqueous portion thereof, leaving an essentially solid, less hazardous product of substantially reduced volume for subsequent disposal or reprocessing.

The spent catalyst often includes various halogenated and unhalogenated organic liquids as mentioned above which are of varying volatility and may be distributed in both the liquid and sludge portions with the antimony and arsenic halides. Preferably, the organic liquids are removed from the spent catalyst by stripping the organics present in the liquid portion from the reaction mass following neutralization.

Typically, the spent catalyst is stored in a holding vessel at the chlorofluorocarbon production site and will include both of the aforementioned liquid and sludge portions. In the preferred embodiment, the two portions are treated separately with the liquid portion being removed and treated first, preferably by the procedure mentioned above. Removal of the sludge portion is facilitated by contacting the sludge, preferably in situ, with an organic liquid acting as a solvent to substantially dissolve the sludge. The organic liquid preferred comprises a selected portion of the organics collected from previous treatments and mixed with fresh organic solvent, preferably n-butanol. After the sludge is dissolved, the mixture of sludge and organic liquid is removed from the holding vessel and treated in the same manner as the previously treated liquid portion. During treatment of the sludge portion, the organic liquids are again recovered by stripping providing further solvent for use in subsequent treatments.

A process of treating spent catalyst according to the present invention is carried out being conventional and readily available processing equipment, the selection and operation of which will be known to those of ordinary skill in the art. Accordingly, drawings depicting the processing equipment and a specific description thereof are omitted for the purpose of clarity, reference being had to specific equipment items or groups thereof as necessary to illustrate suitable processing apparatus for carrying out the process of the present invention. It is particularly noted that the reactor of choice in a typical process of this type is provided with a glass lining to protect the reactor from attack by various acidic components expected to be present in the spent catalyst or produced when it is hydrolyzed, and to avoid contamination of the catalyst with undesirable metal constituents, if it is desired to recover the antimony halides for reuse.

In carrying out the process of the present invention, a storage vessel containing spent catalyst may first be vented to a suitable caustic solution scrubber for removal and treatment of the more volatile constituents which are mainly low-boiling organics. Then, the storage vessel is fitted with a prepared piping and equipment rig capable of removing the liquid spent catalyst and of spray washing the interior of the vessel with a solution of organic liquids acting as a solvent to dissolve the sludge portion as will be described.

In the preferred embodiment, the upper liquid portion of catalyst is treated first. Preferably, removal of the liquid portion from the storage vessel is preceded by addition of a measured quantity of an aqueous solution of ferric chloride to a glass-lined reactor connected by a glass-lined vapor line to a suitable condenser and an associated decanter. The quantity of ferric chloride is dependet on a projection of the quantity of fluoride ions which will be present in the reaction mass following hydrolysis of the spent catalyst.

Then, a measured amount of water if necessary is added to the reactor to provide for adequate hydrolysis of the spent catalyst and in particular the hydrolysis of the various antimony and arsenic halides present. The water added is preferably recycled from previous treatments as will be described so as to minimize water use and discharge requirements.

Following the addition of any necessary water for hydrolysis, the liquid portion of the waste catalyst is pumped into the reactor from the storage vessel at a measured rate and preferably through a dip pipe into an agitated zone of the reactor. When the catalyst hydrolyzes, halide ions are produced including chloride and fluoride ions resulting an acidic reaction mass. The ferric ions complex the fluoride ions to produce a soluble ferric ion/fluroide ion complex which binds the fluoride ions to the ferric ions in solution. As a result, the fluoride ions are not free to attack the glass-lined processing equipment as would be the case if the fluoride ions were present as the free acid, for example.

The addition rate of catalyst is controlled so that the reaction of complexing the fluoride ions can take place substantially simultaneously with hydrolysis of the catalyst, and preferably in the nature of a localized reaction adjacent the opening of the dip tube to prevent formation of a free fluoride ion concentration high enough to attack the processing equipment. As a precaution to detect a potential lining failure, the reactor may be fitted with a galvanic cell-type detector. The catalyst hydrolysis reaction is exothermic. For example, a heat of reaction of $-12.32$ cal/gram of catalyst has been observed.

After the catalyst is added to the reactor, and hydrolysis and complexing are complete, the reaction mass is neutralized, preferably through the use of an aqueous suspension of calcium hydroxide which is added at a measured rate through its own opening in the reactor until the reaction mass reaches a pH of about 7.0. Good results have also been obtained using an aqueous suspension of magnesium hydroxide to accomplish the neutralization. While an aqueous suspension is preferred, the invention includes direct addition of dry calcium hydroxide, magnesium hydroxide, or other equivalent compounds to the reaction mass.

As the calcium hydroxide is added, heat will be generated bringing the reaction mass to boiling. To prevent acid gases from reaching the metal condenser, the glass-lined vapor line from the reactor to the condenser may be passed through a base solution during the neutralization. Should foaming become a problem, a suitable antifoam material may be added.

The neutralization results in further precipitation of compounds in the reaction mass including insoluble calcium fluoride and iron hydroxide from the previous ferric ion/fluoride ion complexes which are suspended in slurry form in the reactor along with the other precipitates formed in the hydrolysis. It is noted that a calcium fluoride precipitate is produced at an essentially neutral pH rather than in an acidic medium. In the latter case, calcium fluoride exhibits appreciable solubility releasing fluoride ions with detrimental effects on the processing equipment. In the present invention, the fluoride ions remain bound either in a ferric ion/fluoride ion complex in the acidic reaction mass following neutralization, or as insoluble calcium fluoride following neutralization and thus are prevented from damaging the processing equipment.

Following neutralization of the reaction mass, volatile organic liquids present in the waste catalyst feed are removed from the reaction mass, preferably by heating to drive off the organic liquids as vapors which are then condensed and separated from the codistilled water in the decanter. The heating is preferably accomplished through the expendient of a steam jacket on the reactor along with a dip tube opening into the reactor for direct injection of steam into the reaction mass to speed up the distillation and maintain the fluidity of the slurry in the reactor, the above heating by means of steam being referred to hereinafter generally as stripping. The stripping is continued for a sufficient period of time and at a sufficient temperature to insure substantially complete removal of the organics from the reaction mass; e.g., the reaction mass is heated until the overhead vapors reach over about 100° C. which heating is then maintained for about 15 to 30 minutes. The temperature of the reaction mass may be in the range from about 113 to about 115° C. and during the heating process the pH may need to be adjusted by further additions of calcium hydroxide to maintain the pH at about 7.0.

The overhead vapors from the reactor are condensed to form an aqueous phase and an organic phase which are phase separated in the decanter. The upper aqueous layer is stored in a tank and used as recycled water for hydrolyzing the spent catalyst in subsequent treatments. During the stripping process, a first cut of the bottom organic layer is collected and saved separately for recycle as will be described until the overhead vapor temperature reaches from about 95° to about 97° C. A second cut of the organics collected over from about 95° to about 97° C., together with any excess of the above lower boiling organic liquids, is preferably collected separately for additional treatment and disposal.

After the previously described stripping, the material in the reactor may be pumped to a holding vessel and then ultimately passed to a drier to obtain a product of substantially reduced volume for disposal or reprocessing. A preferred drier for this purpose is a mobile continuous pulse combustion system.

As previously mentioned, treatment of the sludge portion of the spent catalyst is preferably accomplished following treatment of the liquid portion and may be carried out using the same processing equipment as was used in treating the liquid portion. To process the sludge, it has been found advantageous to prepare it in a way so to enable the sludge to be more readily transported to the reaction vessel, and to promote the desired reactions and hydrolysis of the components of the sludge portion. According to the preferred embodiment of the invention, this is accomplished by contacting the sludge with an organic liquid to dissolve the various constituents of the sludge in a liquid phase by which the same may be more readily transported to the reaction vessel and more uniformly and completely treated. Preferably, the organic liquid comprises a mixture of the first cut liquid organics collected in previous treatments such as that collected from the stripping of the liquid portion, and fresh n-butanol in an amount equal to at least about 5% based on the total weight of the mixture. This mixture is referred to hereinafter as the solvent mixture. Most preferably, the solvent mixture includes at least four parts previously recovered first cut organic liquids to one part fresh n-butanol. The solvent mixture is preferably sprayed into the spent catalyst storage vessel and agitating means such a stirrer or the like may be provided in the vessel to facilitate mixing and contact of the solvent mixture with the sludge. It is noted that the term "dissolve" as used herein is intended to encompass entrainment or mixing of the sludge constituents in the solvent mixture as well as any other mechanism by which the constituents may be dispersed in the solvent mixture in addition to dissolving therein.

Normally, heat will be generated as the sludge is dissolved in the solvent mixture which may result in a 20° C. temperature rise or more for an equal weight of the solvent mixture added to a 50/50 mixture of sludge and liquid. In the preferred embodiment, an equal weight of the above 4/1 solvent mixture is sprayed into the storage vessel and contacted with the waste catalyst by suitable means as described and then circulated for a sufficient period of time to accomplish substantially complete dissolving of the sludge. The sludge/solvent mixture is then pumped to the reaction vessel containing a ferric chloride solution and treated according to the previously described process for treating the liquid portion.

During the hydrolysis reaction, the heat of reaction for the sludge/solvent mixture may be lower than that of the liquid portion. For example, the heat of reaction for the sludge hydrolysis may result in a temperature rise of about 5° C., whereas the heat of reaction for the liquid portion may result in a temperature rise of as much as 38° C. or more. In addition, most of the n-butanol remaining in the reaction mass following neutralization will be collected in the condenser up to an overhead temperature of from about 95° to 97° C., permitting its reuse in subsequent treatments. The quantity of organic liquid collected prior to the vapor temperature reaching 95° to 97° C. will typically be greater during treatment of the sludge portion and it may be necessary to dispose of the organic liquids that are collected in excess of the amount needed for mixing with nbutanol to dissolve the sludge in subsequent batches.

Before the recovered organic liquids and n-butanol (when present) can be used in dissolving the sludge portion, it is preferred that they be dried to remove any water therefrom so that hydrolysis does not occur during contact with the sludge. This is preferably accomplished by returning the first cut organic liquids to the emptied and cleaned reactor and using only indirect heating to azeotrope over the water which is then phase separated in the decanter with the water going to the recycle tank and the organic phase returning to the reactor as reflux. The liquid temperature in the reactor may be in the range of about 115° C. and the overhead vapors about 85° C. Preferably, distillation is continued until the overhead vapor temperature is about 88° C. to insure substantially complete removal of the water which should comprise less than about 0.08% by weight of the recovered organic liquids before they are contacted with the sludge.

The process described above avoids time consuming and complicated separation steps such as settling, filtration and caking, extractions, etc. which have been used in treating spent catalyst according to methods previously employed. And, in the present process, the organic liquids in the spent catalyst are removed from the reaction mass following neutralization by heating and reused in the process to the extent possible for the purpose of dissolving the sludge portion of the spent catalyst. The portion of the organic liquids which are not reused in the process is relatively small and may be placed in permanent containers for safe disposal or reprocessed to separate out the useful constituents. Also, water requirements are minimized with little or no liquid water being released to the environment because essentially all of the water that is rejected leaves as water vapor in the product drier. The remainder of the water is reused in the process after collection in the condenser to hydrolyze the spent catalyst.

A further advantage of the invention is that it provides for effective treatment of the sludge portion of the spent catalyst by dissolving the sludge with a solvent mixture of organic liquids comprising previously recovered halogenated organic liquids, preferably mixed with fresh nbutanol. As a result, the sludge is more readily transported to the reactor and treatment of the sludge may be accomplished in substantially the same manner as the liquid portion and in the same equipment. Thus, the entire spent catalyst volume may be treated in a manner which minimizes equipment and material requirements. Also, the reactor and associated equipment along with the product dryer can be easily transported to the chlorofluorcarbon production site where the spent catalyst is stored, eliminating the need to transport the catalyst to a remote treatment facility.

The following example illustrates the invention but is not considered to be limiting thereof. Unless otherwise indicated, all parts in the examples and elsewhere in the specification are by weight and all temperatures are in degrees Centigrade.

EXAMPLE

Utilizing suitable equipment such as has been described in the specification, 39 gallons of a commerical grade 30% ferric chloride solution are added to an empty glass-lined reactor having a jacket for indirect steam heating thereof and also fitted with an open steam dip tube for direct steam heating of the contents. The ferric chloride solution contains 134 pounds of ferric chloride, 9 pounds of hydrochloric acid and 305 pounds of water, and has a pH of less than 1.0. Eightly gallons or 666 pounds of water are added to the reactor which is also fitted with a mixer for agitation of contents.

Two thousand pounds of spent catalyst from chlorofluorocarbon production are contained in a closed storage vessel, and have a volume of 118 gallons. Approximately half of the spent catalyst or 1000 pounds comprises an essentially liquid portion and the other half comprises a sludge or semisolid portion. The composition of the liquid portion of the spent calatyst includes 74 pounds of $SbCl_3$, 558 pounds of antimony $SbCl_5$, 115 pounds of $AsCl_3$, 58 pounds of mixed fluorides, 195 pounds of mixed organic compounds, and trace amounts of heavy metals. The container is vented to a main alkaline scrubber to remove gaseous components of the spent catalyst. The liquid portion, approximately 59 gallons, is pumped from the container into the reactor at a rate of 5 gallons per minute through a dip tube having an opening located in the agitated zone of the reactor.

As the catalyst is added to the reactor, it hydrolyzes locally adjacent the dip tube to produce fluoride ions which are complexed substantially immediately upon production by the ferric ions present in the reactor. As a consequence, the fluoride ions are not available for attacking the glass lining of the reactor which remains substantially intact. The hydrolysis reaction is exothermic and a temperature increase in the reactor of about 38° C. occurs.

Following the waste catalyst addition, the reaction mass is neutralized by adding a 35% lime slurry to the reactor at a rate of 10 gallons per minute until the reaction mass reaches a pH of about 7.0. One hundred fifty-seven gallons of the lime slurry are added including 1,060 pounds of water, 500 pounds of calcium hydroxide, and the remainder of the slurry comprising a mixture of other salts. The neutralization produces heat and raises the temperature of the reaction mass sufficient to induce boiling thereof at about 100° C.

A condenser and its associated decanter are located adjacent the reactor and connected thereto by a glass-lined vapor line. The vapor line passes through a base solution trap to prevent acid gases from reaching the condenser.

The volatile organic materials in the reaction mass are stripped by direct and indirect steam stripping using both the jacket and open steam dip tube. Of the steam used to accomplish the stripping, approximately 120 pounds enter the reaction mass through the open steam dip tube. The condensable vapors are condensed in the condenser and the noncondensable constituents thereof are passed to the alkaline scrubber. The liquids are collected in the decanter and include an upper aqueous layer and a lower, mainly organic liquid layer. The layers are phase separated with the upper aqueous layer being stored in a tank and used for recycle water in subsequent treatments. The steam stripping is continued until the overhead vapors reach 100° C. and maintained thereafter for an additional 30 minutes.

Approximately 14 gallons or 120 pounds of water are collected in the aqueous phase of the decanter. Approximately 14 gallons or 195 pounds of organic liquids are collected in the bottom layer of the decanter, and the portion of these organic liquids collected prior to the overhead temperature reaching 96° C., about 150 pounds, is stored in an organics' storage tank for reuse in dissolving the sludge portion of the spent catalyst. The portion collected over about 96° C. is stored separately for disposal.

Following stripping of the volatile organics from the neutralized reaction mass, a slurry comprising 3,550 pounds of treated spent catalyst is pumped from the reactor to a holding tank containing a stirrer and is retained in the holding tank and agitated prior to drying the slurry. The composition of the slurry includes approximately 1,950 pounds of water and 1,600 pounds of various salts including dispersed precipitates. The precipitates include insoluble compounds of antimony and arsenic as well as calcium fluoride and iron hydroxide produced when the reaction mass is neutralized with calcium hydroxide. The total volume of treated spent catalyst sent to the holding tank is about 300 gallons and the pH of the slurry is approximately 7.0.

The sludge portion, approximately 1,000 pounds, of the spent catalyst in the storage vessel is treated following treatment of the liquid portion. One thousand pounds or 91 gallons of a mixed organic liquid comprising 800 pounds of chlorinated hydrocarbon liquids and 200 pounds of n-butanol are sprayed into the vessel by suitable means and circulated until the sludge portion is substantially dissolved therein. The mixed sludge and organic liquids are pumped from the vessel to a holding tank where gases are vented to the plant alkaline scrubber. The mixed sludge and organic liquids in the holding tank have a total weight of 2,000 pounds, a volume of about 150 gallons, and comprise 912 pounds of mixed chlorinated hydrocarbon liquids, 200 pounds of n-butanol, 398 pounds of $ScCl_3$, 279 pounds of $SbCl_5$, 140 pounds of $AsCl_3$, and 71 pounds of mixed fluoride compounds. The pH of the mixture is less than 1.0 and the temperature of the mixture is about 57° C. A temperature increase of about 18° C. occurs during the solvation of the sludge portion of the spent catalyst.

The reactor is charged with 965 pounds or 82 gallons of a 30% ferric chloride solution comprising 655 pounds of water, 290 pounds of ferric chloride, and 20 pounds of hydrochloric acid. To provide adequate water for hydrolysis, thirty-nine gallons or 325 pounds of a water/butanol mixture including 25 pounds of n-butanol are added to the ferric chloride solution. The volume of mixed sludge and organic liquids is added to the reactor as described above in the treatment of the liquid portion to hydrolyze the catalyst and complex fluoride ions produced during the hydrolysis. A temperature increase in the reactor of about 5° C. is observed. When the hydrolysis and complexing are completed, 2,100 pounds or 200 gallons of a 35% lime slurry are added to the reactor as in the treatment of the liquid portion and comprises 1,365 pounds of water and 735 pounds of calcium hydroxide. The heat of the neutralization brings the reaction mass to boiling at about 100° C.

When the neutralization is complete, the organic liquids are steam stripped from the reaction mass using both the reactor jacket heating and the open steam dip tube, approximately 300 pounds of steam entering the reaction mass through the open tube. Three hundred pounds of water and 25 pounds of n-butanol are collected in the upper aqueous layer of the decanter following condensation of the vapors and are stored for use as make-up water in hydrolyzing the catalyst during subsequent treatments. The quantity of liquid collected in the organic layer of the decanter upon condensation of the gases evolved during stripping is about 1,085 pounds of which 965 pounds are collected prior to the overhead vapor temperature in the condenser reaching 96° C. This latter portion of the liquids is passed to the organics' storage tank for reuse in dissolving the sludge in subsequent treatments and comprises 800 pounds of mixed chlorinated hydrocarbons, 150 pounds of n-butanol, and about 15 pounds of water. The other portion of the organic liquids collected, approximately 120 pounds, is passed to a holding vessel for further treatment and disposal and comprises about 115 pounds of mixed chlorinated hydrocarbons, 5 pounds of n-butanol, and a trace of water.

Following the stripping of organic liquids from the reaction mass, the treated catalyst in slurry form is pumped from the reactor to the holding tank which contains the treated catalyst slurry from the liquid portion previously processed. The volume of the slurry remaining after steam stripping is about 357 gallons or 4,280 pounds comprising 2,305 pounds of water, 1,930 pounds of mixed salts having a composition generally as described above for the treated liquid portion, 45 pounds of mixed chlorinated hydrocarbons, and a trace of n-butanol.

The combined organic liquids collected from both the liquid and sludge portions prior to the overhead vapor temperature reaching about 96° C. are pumped from the organics' storage tank to the reactor and are dried in an azeotropic distillation using only jacket heating. The purpose of the distillation is to substantially remove water from the organic liquids to minimize any hydrolysis which may otherwise occur when the liquid is mixed with the sludge to dissolve the same in subsequent treatments. The organic liquid to be treated has a quantity of about 1115 pounds or 100 gallons and comprises 950 pounds of mixed chlorinated hydrocarbons, 150 pounds of n-butanol, and 15 pounds of water. An azeotropic distillation is performed until the overhead vapor temperature is about 88° C. The condensed liquid remaining in the decanter contains substantially all of the water or 15 pounds and about 2 pounds of n-butanol, and is passed to the aqueous holding tank for reuse as makeup water for hydrolyzing the spent catalyst in subsequent treatments.

The combined slurry from both the liquid and sludge portions is pumped from the holding tank to a mobile continuous pulse combustion drying system. The system has two $3.5 \times 10^6$ btu combuster units requiring approximately 1,450 btu-input/pound-water removed. Number 2 distillate fuel oil is used to provide heating for the system. Approximately 7,830 pounds or 657 gallons of the slurry are dried comprising 45 pounds of mixed halogenated organic liquids, 4,255 pounds of water, a trace of n-butanol and 3,550 pounds of mixed salts to produce approximately 95,000 standard cubic feet of flue gas containing substantially all of the water present in the treated catalyst and approximately 44.9 cubic feet of dried product containing the salts and the halogenated residues. The dried produce is a hydroscopic powder having a density of about 80 pounds per cubic foot and is placed in bulk disposal containers for subsequent processing or disposal. The temperature of the flue gases varies from about 50° to about 65° C.

Having fully described preferred embodiments of the present invention, it will be understood by those of ordinary skill in the art that the invention is capable of numerous rearrangements, modifications, and substitutions which fall within the scope and spirit of the claims below.

What is claimed is:

1. A process for treating spent catalyst from chlorofluorocarbon production wherein the catalyst includes antimony halides and undergoes hydrolysis in an aqueous medium to produce insoluble antimony compounds and fluoride ions, the process comprising hydrolyzing the catalyst in an aqueous solution of ferric chloride having a sufficient concentration of ferric ions to complex substantially all of the fluoride ions produced upon hydrolysis of the catalyst, neutralizing the reaction mass present following hydrolysis of the catalyst and complexing of the fluoride ions by contacting the reaction mass with an aqueous suspension of a compound selected from the class consisting of calcium hydroxide and magnesium hydroxide, and separating the insoluble antimony compounds from the neutralized reaction mass.

2. The process of claim 1, wherein the insoluble antimony compounds are separated from the neutralized reaction mass by heating the mass in a drier to evaporate the liquid portion thereof.

3. The process of claim 1, wherein the catalyst further includes volatile organic liquids which are stripped from the reaction mass following neutralization and prior to separation of the insoluble antimony compounds.

4. The process of claim 1, wherein the catalyst includes a liquid portion and a sludge portion, and the process further comprises treating the liquid portion separately of the sludge portion, the treatment of the sludge portion following the treatment of the liquid portion and including contacting the sludge portion prior to hydrolysis with an organic solvent to substantially dissolve the sludge.

5. The process of claim 4, further comprising stripping the organic solvent present in the reaction mass following neutralization and recovering the stripped solvent for reuse in dissolving the sludge.

6. The process of claim 4, wherein the catalyst includes volatile organic liquids and the process further comprises stripping the volatile organic liquids together with the organic solvent from the reaction mass following neutralization, recovering the stripped organics, and collecting separately a selected portion of the stripped organics for reuse in dissolving the sludge.

7. The process of claim 3, 4, 5, or 6, wherein the organic solvent comprises n-butanol in an amount equal to at least about 5% based on the total weight of the solvent.

8. The process of claim 2, 3, 4, 5, or 6, wherein the reaction mass is neutralized by contacting it with an aqueous suspension calcium hydroxide.

9. A process for treating spent catalyst from chlorofluorocarbon production wherein the spent catalyst includes a liquid and a sludge portion, antimony halides which produce insoluble antimony compounds and fluoride ions upon hydrolysis, and a mixture of volatile organic liquids, all of which are present in both the liquid and sludge portions, the process comprising separating the liquid and sludge portions, hydrolyzing the liquid portion in an aqueous solution of ferric chloride having a sufficient concentration of ferric ions to complex substantially all of the fluoride ions produced upon hydrolysis of the catalyst, neutralizing the reaction mass following hydrolysis by contacting the reaction mass with a compound selected from the group consisting of calcium hydroxide and magnesium hydroxide, further treating the reaction mass following neutralization to substantially remove insoluble antimony compounds and organics therefrom, dissolving the sludge portion using an organic solvent to produce a sludge/solvent mixture, and hydrolyzing, neutralizing, and further treating the sludge/solvent mixture in the same manner as the liquid portion.

10. The process of claim 9, wherein the liquid portion is hydrolyzed neutralized, and further treated prior to dissolving the sludge portion and the organic solvent comprises at least a portion of the organics removed from the liquid portion of the spent catalyst following hydrolysis and neutralization thereof.

11. The process of claim 9, wherein the further treatment includes heating the reaction mass to strip the volatile organic liquids therefrom, and collecting at least a portion of the volatile organic liquids for reuse in dissolving the sludge portion.

12. The process of claims 9, 10, or 11, wherein the organic solvent comprises a mixture of n-butanol and volatile organic liquids removed from the reaction mass in previous further treatments of both the liquid and sludge portions.

13. The process of claim 12, wherein the mixture of n-butanol and volatile organic liquids comprises about one part n-butanol to about four parts volatile organic liquids and the mixture is provided in an amount substantially equal to the amount of the sludge portion which is to be treated.

* * * * *